US011519368B2

(12) United States Patent
Cowan et al.

(10) Patent No.: US 11,519,368 B2
(45) Date of Patent: Dec. 6, 2022

(54) HEAT EXCHANGER SUPPLY PLENUM

(71) Applicant: UNITED TECHNOLOGIES CORPORATION, Farmington, CT (US)

(72) Inventors: Curtis C. Cowan, E. Hampton, CT (US); Rebecca R. Dunnigan, Sturbridge, MA (US); Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 144 days.

(21) Appl. No.: 16/736,342

(22) Filed: Jan. 7, 2020

(65) Prior Publication Data
US 2021/0207564 A1 Jul. 8, 2021

(51) Int. Cl.
F02M 35/10 (2006.01)
B60K 13/02 (2006.01)

(52) U.S. Cl.
CPC ........... F02M 35/10268 (2013.01); F02M 35/10052 (2013.01); F02M 35/10203 (2013.01); B60K 13/02 (2013.01)

(58) Field of Classification Search
CPC ....... F02M 35/10268; F02M 35/10052; B60K 13/02
USPC ...................................... 123/198 R
See application file for complete search history.

(56) References Cited

U.S. PATENT DOCUMENTS

| 7,334,411 | B2 | 2/2008 | Vandermolen |
| 7,784,528 | B2 | 8/2010 | Ottow et al. |
| 7,861,512 | B2 | 1/2011 | Olver et al. |
| 8,876,465 | B2 | 11/2014 | Stretton |
| 8,961,114 | B2 | 2/2015 | Ruthemeyer |
| 9,394,828 | B2 | 7/2016 | Eleftheriou et al. |
| 10,107,556 | B2 | 10/2018 | Buckrell et al. |
| 10,196,932 | B2 | 2/2019 | Sennoun |
| 10,480,407 | B2 | 11/2019 | Alecu |
| 2012/0304662 | A1* | 12/2012 | Prociw .......... F01D 25/14 60/782 |
| 2013/0276476 | A1* | 10/2013 | Wong .......... F25B 1/005 62/513 |
| 2015/0211801 | A1 | 7/2015 | Philippart et al. |
| 2016/0201989 | A1* | 7/2016 | Martinez .......... F02K 3/06 60/806 |
| 2017/0184024 | A1 | 6/2017 | Sennoun |

FOREIGN PATENT DOCUMENTS

CA 2976550 6/2018

OTHER PUBLICATIONS

European Patent Office, European Search Report dated Jun. 7, 2021 in Application No. 21150221.6.

* cited by examiner

Primary Examiner — Lindsay M Low
Assistant Examiner — Omar Morales
(74) Attorney, Agent, or Firm — Snell & Wilmer L.L.P.

(57) ABSTRACT

A cooling system for a gas turbine engine may comprise a plenum extending circumferentially around an outer engine case structure. The plenum may comprise a supply conduit and a return conduit. The supply conduit and the return conduit may be in fluid communication with a heat exchanger. The heat exchanger may be disposed between the outer engine case structure and an inner engine case structure. The plenum may be configured to provide enhance heat transfer for the cooling system.

15 Claims, 5 Drawing Sheets

HEAT EXCHANGER SUPPLY PLENUM

STATEMENT OF GOVERNMENT INTEREST

This invention was made with Government support awarded by the United States. The Government has certain rights in this invention.

FIELD

The present disclosure relates to gas turbine engines, and, more specifically, to a heat exchanger supply plenum for a gas turbine engine.

BACKGROUND

A gas turbine engine typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor section and other gas turbine engine loads.

Gas turbine engines may include various cooling systems that employ heat exchangers. Bypass air may be directed across the heat exchangers as a cooling fluid. The inlet piping of the heat exchanger (i.e., the bypass air exiting the heat exchanger) may partially block and/or adversely heat up an engine bay. The piping may also cause pressure loss that may otherwise be used to drive heat rejection in the heat exchanger.

SUMMARY

A cooling system for a gas turbine engine is disclosed herein. The cooling system may comprise: an outer engine case structure; an inner engine case structure disposed radially inward of the outer engine case structure, the inner engine case structure and the outer engine case structure defining a bypass duct; a heat exchanger disposed between the outer engine case structure and the inner engine case structure; a supply conduit disposed radially outward of the outer engine case structure, the supply conduit extending circumferentially about the outer engine case structure, the supply conduit fluidly coupled to the heat exchanger; and a return conduit disposed radially outward of the outer engine case structure and axially adjacent to the supply conduit, the return conduit extending circumferentially about the outer engine case structure, the return conduit fluidly coupled to the heat exchanger.

In various embodiments, the supply conduit comprises a first annular tube, and wherein the return conduit comprises a second annular tube. The supply conduit may further comprise a first plurality of heat fins and a second plurality of heat fins, wherein the first plurality of heat fins extend from a first radially inner surface of the supply conduit, and wherein the second plurality of heat fins extend from a second radially inner surface of the return conduit. The supply conduit and the return conduit may be integral to the outer engine case structure. The cooling system may further comprise insultation configured to enclose the supply conduit and the return conduit. The outer engine case structure, the supply conduit, and the return conduit may be a monolithic component. The supply conduit and the return conduit may be radially adjacent to the outer engine case structure.

A cooling system for use in a gas turbine engine is disclosed herein. The cooling system may comprise: an outer engine case structure; an inner engine case structure disposed radially inward of the outer engine case structure, the inner engine case structure and the outer engine case structure defining a bypass duct; a heat exchanger disposed between the outer engine case structure and the inner engine case structure; a supply conduit extending circumferentially about the outer engine case structure, the supply conduit fluidly coupled to the heat exchanger; a return conduit extending circumferentially about the outer engine case structure, the return conduit fluidly coupled to the heat exchanger; and an axial wall disposed between the supply conduit and the return conduit.

In various embodiments, the axial wall may comprise a cavity disposed between a first axial surface in the supply conduit and a second axial surface in the return conduit. The supply conduit, the return conduit, and the axial wall may be integral to the outer engine case structure. In various embodiments, the supply conduit and the return conduit may each have a substantially rectangular cross-sectional shape. The cooling system may further comprise insulation configured to enclose supply conduit, the return conduit, and the axial wall. The cooling system may further comprise a first plurality of heat fins extending from radially outward from a first radially inner surface of the supply conduit, and a second plurality of heat fins extending radially outward from a second radially inner surface of the return conduit. The supply conduit and the return conduit may be annular in shape.

A gas turbine engine is disclosed herein. The gas turbine engine may comprise: an outer engine case structure; an inner engine case structure disposed radially inward of the outer engine case structure, the inner engine case structure and the outer engine case structure defining a bypass duct; a heat exchanger disposed between the outer engine case structure and the inner engine case structure; a supply conduit extending circumferentially about the outer engine case structure, the supply conduit fluidly coupled to the heat exchanger; and a return conduit disposed axially adjacent to the supply conduit, the return conduit extending circumferentially about the outer engine case structure, the return conduit fluidly coupled to the heat exchanger.

In various embodiments, the gas turbine engine may further comprise an axial wall disposed between the supply conduit and the return conduit. The axial wall may comprise a cavity disposed between a first axial surface in the supply conduit and a second axial surface in the return conduit. The supply conduit, the return conduit, and the outer engine case structure may be a monolithic component. The gas turbine engine may further comprise insulation configured to enclose the supply conduit and the return conduit. The gas turbine engine may further comprise a first plurality of heat fins extending from radially outward from a first radially inner surface of the supply conduit, and a second plurality of heat fins extending radially outward from a second radially inner surface of the return conduit.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of a gas turbine engine.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to reference axes other than the engine central longitudinal axis.

A cooling system is disclosed herein. The cooling system may comprise a plenum disposed circumferentially about an outer engine casing. The plenum may be integral to the outer engine casing. The plenum may provide a reduction in pressure loss and/or result in an increase in heat transfer of the cooling system. The reduction in pressure loss may allow for a smaller heat exchanger, compared to a typical heat exchanger, and/or reduce blockage in a bypass duct.

Figure 1:
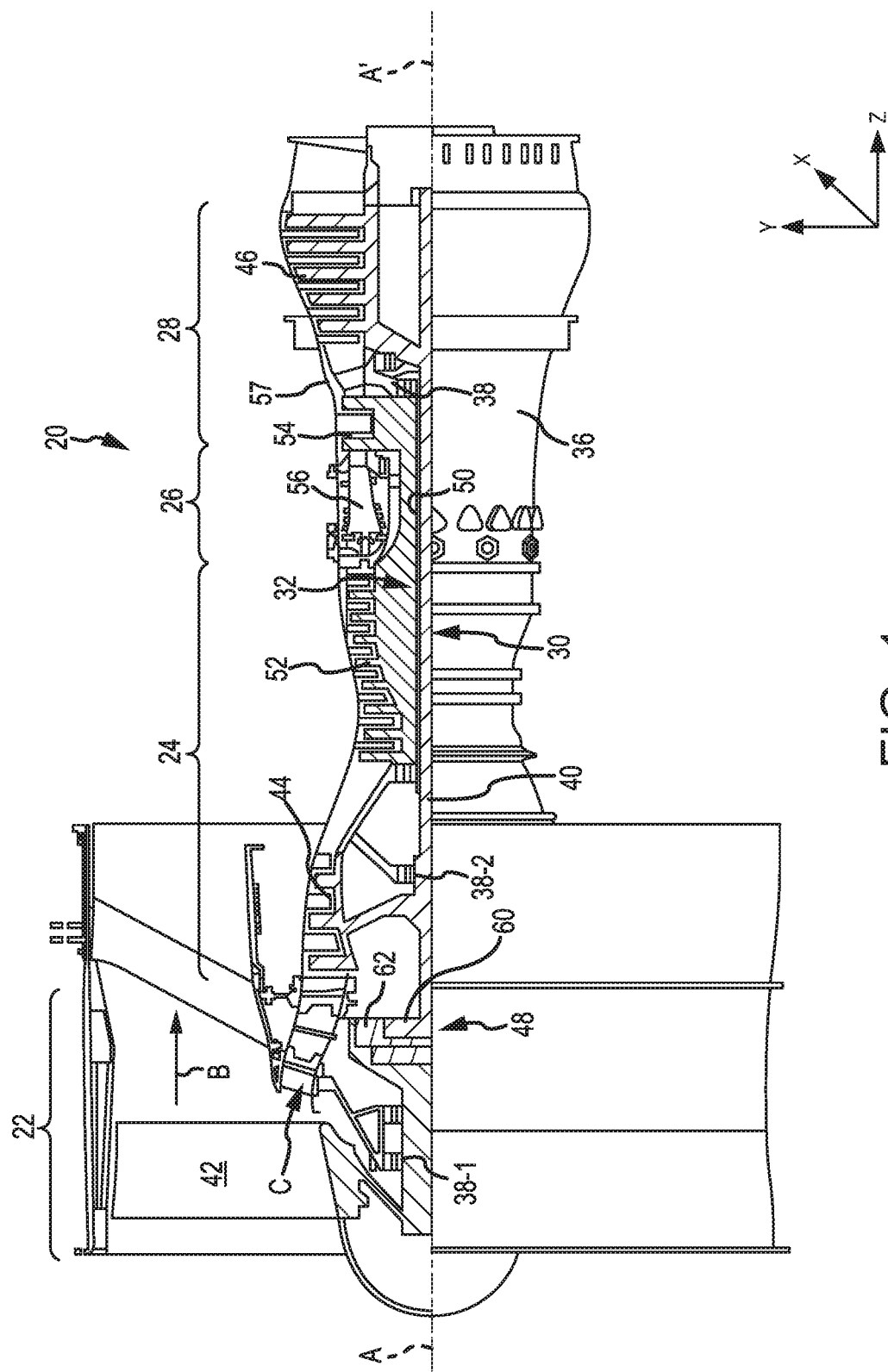
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may generally include a fan section 22, a compressor section 24, a combustor section 26, and a turbine section 28. In operation, fan section 22 drives fluid (e.g., air) along a bypass flow-path B, while compressor section 24 drives fluid along a core flow-path C for compression and communication into combustor section 26 and then expansion through turbine section 28. Although gas turbine engine 20 is depicted as a turbofan gas turbine engine herein, it should be understood that the concepts described herein are not limited to use with turbofans as the teachings may be applied to other types of turbine engines.

Gas turbine engine 20 may generally comprise a low speed spool 30 and a high speed spool 32 mounted concentrically, via bearing systems 38, for rotation about for rotation about engine central longitudinal axis A-A' and relative to an engine static structure 36. It should be understood that various bearing systems 38 at various locations may alternatively or additionally be provided, including for example, bearing system 38, bearing system 38-1, and bearing system 38-2. Engine central longitudinal axis A-A' is oriented in the z direction on the provided xyz axes. The z direction on the provided xyz axes refers to the axial direction. As used herein, the term "radially" refer to directions towards and away from engine central longitudinal axis A-A' and the z-axis. As used herein, the terms "circumferential" and "circumferentially" refer to directions about central longitudinal axis A-A' and the z-axis.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about engine central longitudinal axis A-A', which is collinear with their longitudinal axes. As used herein, a "high pressure" compressor or turbine experiences a higher pressure than a corresponding "low pressure" compressor or turbine. The airflow in core flow-path C may be compressed by low pressure compressor 44 and high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

The compressor section 24, the combustor section 26, and the turbine section 28 are generally referred to as the engine core. Air is drawn into gas turbine engine 20 through fan 42. Air exiting fan 42 may be divided between core flow-path C and bypass flow-path B. The airflow in bypass flow-path B may be utilized for multiple purposes including, for example, cooling and pressurization.

Figure 2:
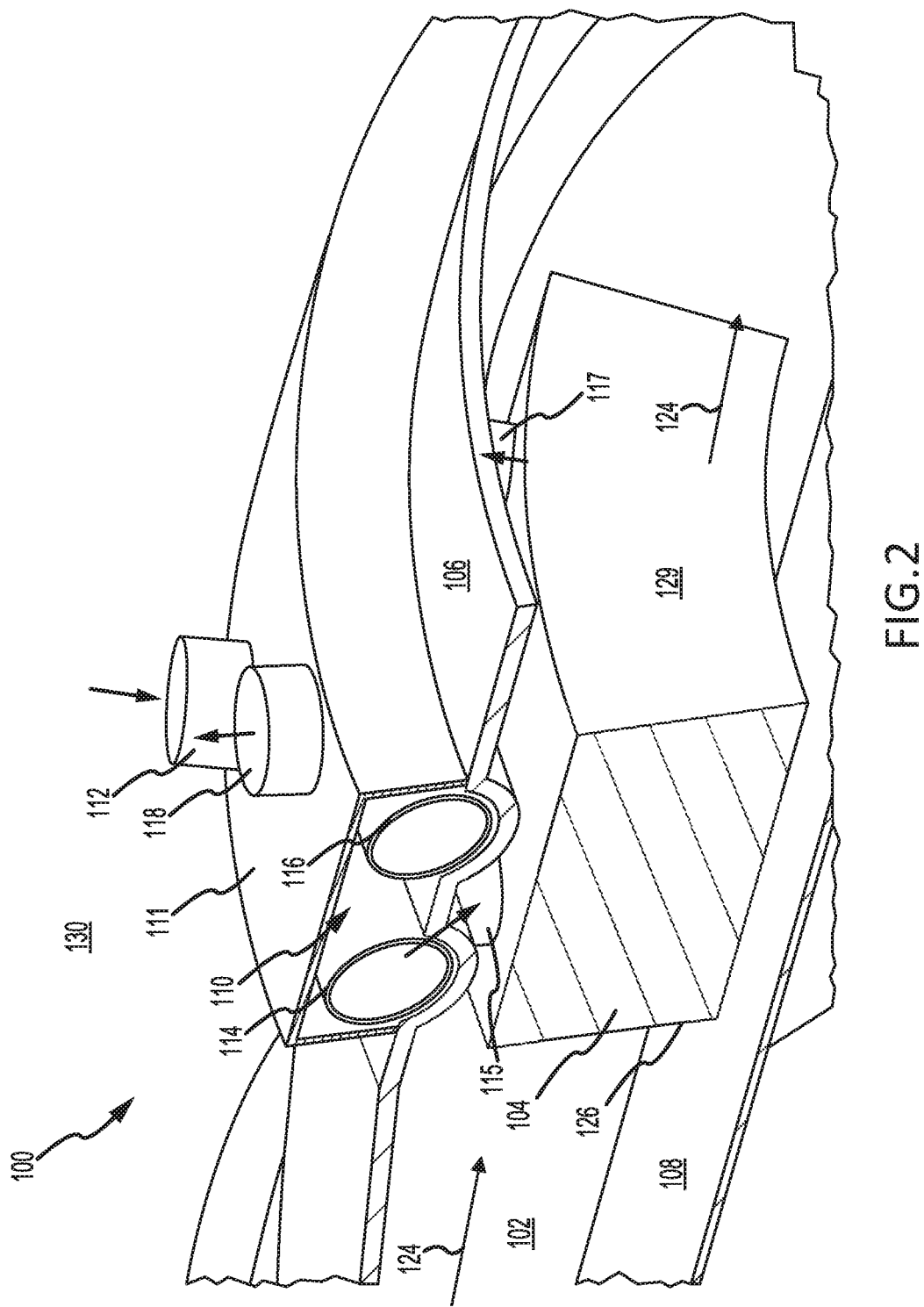
FIG. 2 illustrates a perspective view of a cooling system having a plenum, in accordance with various embodiments.

Referring to FIG. 2, and with continued reference to FIG. 1, a cooling system 100 having a plenum 110 is illustrated, in accordance with various embodiments. Cooling system 100 includes one or more heat exchanger(s) 104. Heat exchanger(s) 104 may be located between an outer engine case structure 106 and an inner engine case structure 108. Outer engine case structure 106 is radially outward of inner engine case structure 108. Outer engine case structure 106 and inner engine case structure 108 may define a generally annular bypass duct 102 around the engine core. In various embodiments, inner engine case structure 108 may form a portion of engine static structure 36. In various embodiments, air discharged from, for example, fan section 22 may be communicated through the bypass duct 102. Plenum 110 may be disposed radially outward from the outer engine case structure 106. In various embodiments, plenum 110 is integral to outer engine case structure 106. In various embodiments, plenum 110 may be coupled to outer engine case structure 106 by any method known in the art, such as welding, brazing, or the like. In various embodiments, plenum 110 may comprise a supply conduit 114 and a return conduit 116. Plenum 110 may be annular in shape and/or form a full hoop around outer engine case structure 106. In various embodiments, plenum 110 may be enclosed by insulation 111 disposed radially outward of plenum 110. The insulation 111 may be configured to prevent heat from escaping plenum 110 during operation of gas turbine engine 20.

In accordance with various embodiments, an inlet conduit 112 may be fluidly coupled between an external source from an aircraft proximate engine bay 130 and a supply conduit 114. Engine bay 130 may be disposed radially outward from outer engine case structure 106. Supply conduit 114 may extend circumferentially about outer engine case structure 106 and/or form an annular tube. The external source from the aircraft may be disposed radially outward of outer engine case structure 106. Inlet conduit 112 directs hot air (i.e., air to be cooled) to heat exchanger 104. In various embodiments, inlet conduit 112 may be downstream of high pressure compressor 52. For example, in various embodiments, inlet conduit 112 may be radially outward of combustor 56. Inlet conduit 112 is fluidly coupled to an inlet 115 of heat exchanger 104. Supply conduit 114 may be fluidly coupled to each heat exchanger 104 by the inlet 115 extending radially inward from supply conduit 114 through outer engine case structure 106.

In accordance with various embodiments, an outlet conduit 118 may be fluidly coupled between an external destination from an aircraft proximate engine bay 130 and return conduit 116. Return conduit 116 may extend circumferentially about outer engine case structure 106 and/or form an annular tube. The external destination from the aircraft may be disposed radially outward of outer engine case structure 106. Outlet conduit 118 directs cool air (i.e., air that is cooled by heat exchanger 104) to the external destination. In various embodiments, outlet conduit 118 may be downstream of high pressure compressor 52. For example, in various embodiments, outlet conduit 118 may be radially outward of combustor 56. Outlet conduit 118 is fluidly coupled to an outlet 117 of heat exchanger 104. Return conduit 116 may be fluidly coupled to each heat exchanger 104 by the outlet 117 extending radially inward from return conduit 116 through outer engine case structure 106.

The hot air provided by inlet conduit 112 is cooled in heat exchanger 104 and then returned to the external source from the aircraft through a return conduit 116. Return conduit 116 is fluidly coupled to an outlet 117 of heat exchanger 104 and outlet conduit 118. The cooled air in return conduit 116 may be directed downstream to cool components in thermally challenged regions. Return conduit 116 may be disposed axially adjacent to supply conduit 114. Return conduit 116 may extend circumferentially about outer engine case structure 106 and/or form an annular tube. The external source from the aircraft may be disposed radially outward of outer engine case structure 106. In various embodiments, the supply conduit 114 and/or the return conduit 116 may be integral to the outer engine case structure 106. By integrating the supply conduit 114 and/or the return conduit 116 into outer engine case structure 106, the cooling system 100 may experience reduced pressure loss in supply conduit 114 and/or the return conduit 116 relative to typical cooling systems in gas turbine engines. In various embodiments, the supply conduit 114 and/or the return conduit 116 may be coupled to the outer engine case structure 106 by any method known in the art, such as brazing, or the like.

Heat exchanger 104 is configured to receive a cooling airflow, for example, airflow 124. In various embodiments, airflow 124 may be a portion of the bypass airflow in bypass duct 102. Cooling airflow 124 may be directed across heat exchanger 104 to cool the air in heat exchanger 104. Airflow 124 flows across and/or through heat exchanger 104 to cool the air provided by inlet conduit 112. Airflow 124 is then output from an exhaust output 129 of heat exchanger 104. Stated differently, heat exchanger 104 receives airflow 124 (i.e. a portion of the airflow in bypass duct 102) at cooling flow input 126 and outputs airflow 124 at exhaust output 129.

Figure 3:
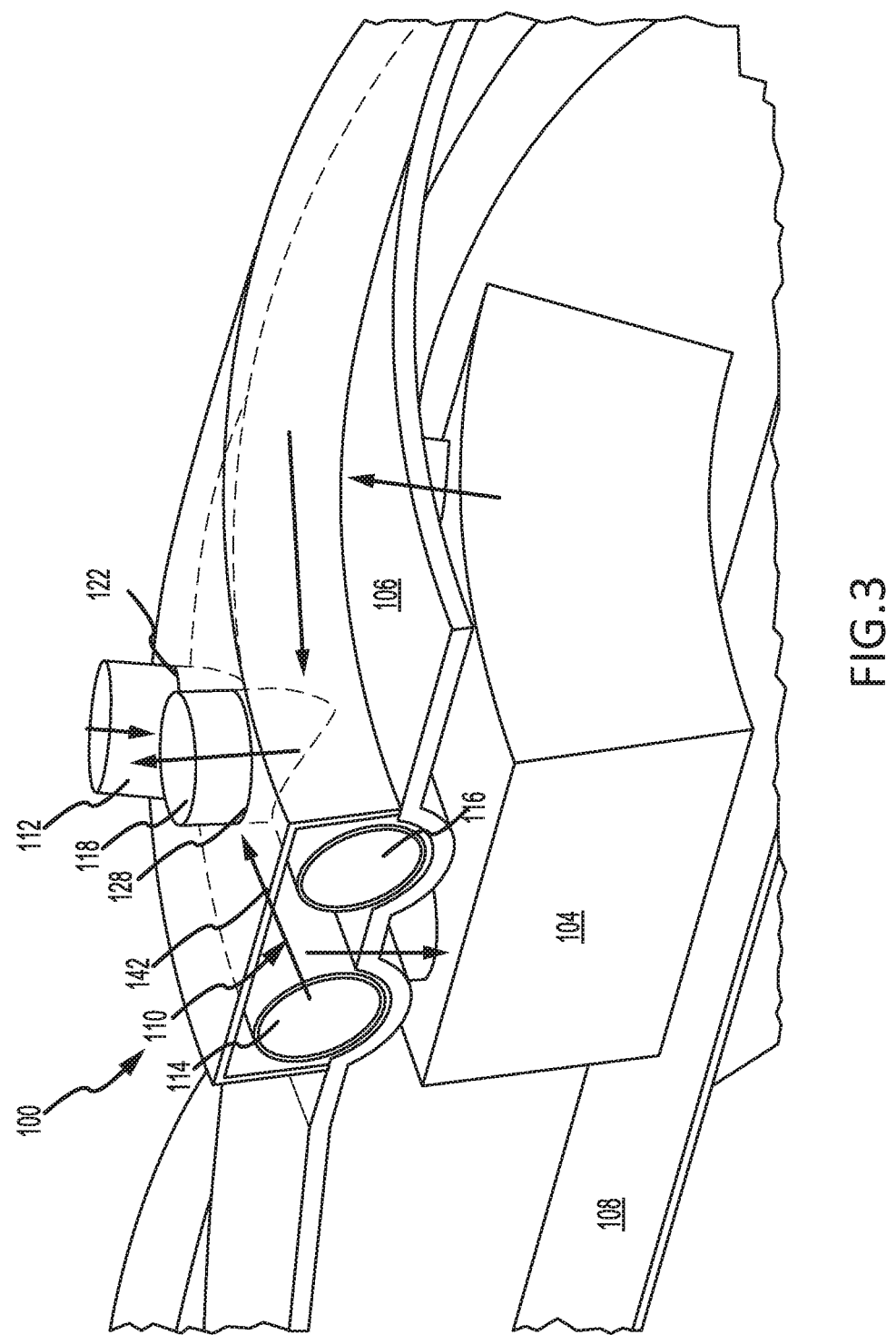
FIG. 3 illustrates a perspective view of a cooling system having a plenum, in accordance with various embodiments.

Referring to FIG. 3, a cooling system 100 having a plenum 110 is illustrated, in accordance with various embodiments. In various embodiments, inlet conduit 112 may be integral to supply conduit 114. Similarly, outlet conduit 118 may be integral to return conduit 116. "Integral," as referred to herein is a monolithic component. In various embodiments, hot air may flow through supply conduit 114 in a first circumferential direction 142 and the return cooler air may flow though return conduit 116 in a second circumferential direction 144. The first circumferential direction 142 and the second circumferential direction 144 may be opposite directions.

In various embodiments, the plenum 110 may comprise an inlet aperture 122 and an outlet aperture 128. The inlet aperture 122 may be configured to receive the inlet conduit 112. Similarly, the outlet aperture 128 may be configured to receive the outlet conduit 118. The plenum 110 may comprise any cross-sectional shape. For example, the plenum 110 may comprise a square shape, a rectangular shape, a semi-circular shape, or the like.

Figure 4:
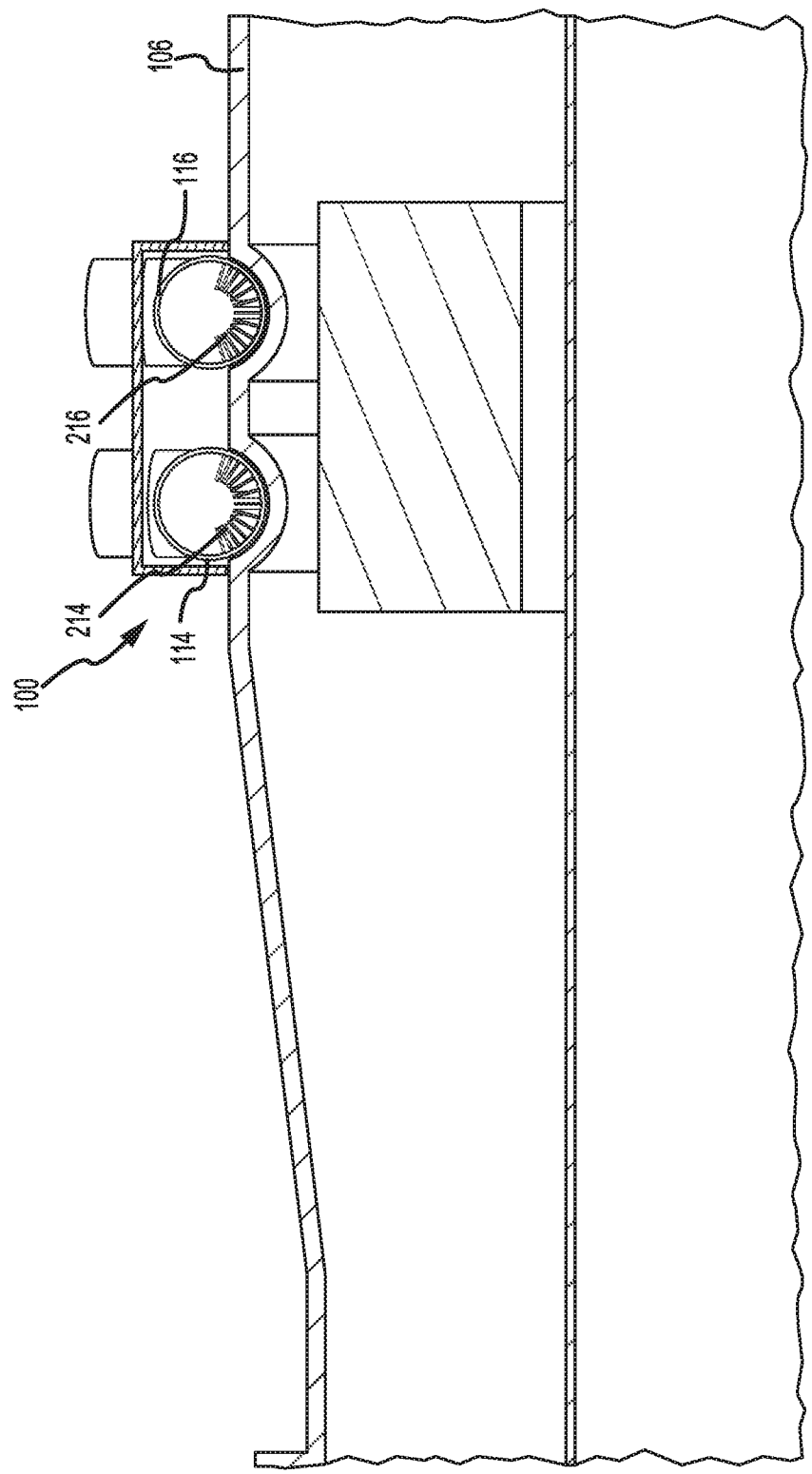
FIG. 4 illustrates a cross-section view of a cooling system having a plenum, in accordance with various embodiments.

Referring now to FIG. 4, a cross-section view of a cooling system 100 having a plenum 110 is illustrated, in accordance with various embodiments. In various embodiments, each conduit disposed in the plenum 110 may comprise a plurality of heat fins disposed therein. For example, supply conduit 114 may comprise a first plurality of heat fins 214 and the return conduit 116 may comprise a second plurality of heat fins 216. The first plurality of heat fins 214 and the second plurality of heat fins 216 may be disposed proximate outer engine case structure 106. The first plurality of heat fins 214 may extend radially inward from a radially inner surface of supply conduit 114. Similarly, the second plurality of heat fins 214 may extend radially inward from a radially inner surface of return conduit 116.

The first plurality of heat fins 214 and the second plurality of heat fins 216 may be configured to enhance heat transfer. For example, the first plurality of heat fins 214 and the second plurality of heat fins 216 may increase a temperature gradient between the supply conduit 114 and/or the return conduit 116 and the environment. In various embodiments, enhanced heat transfer features, such as pins, trip strips, heat fins, or the like, may additionally be placed radially outward from supply conduit 114 and/or the return conduit 116 and/or directed towards heat exchanger 104.

Figure 5:
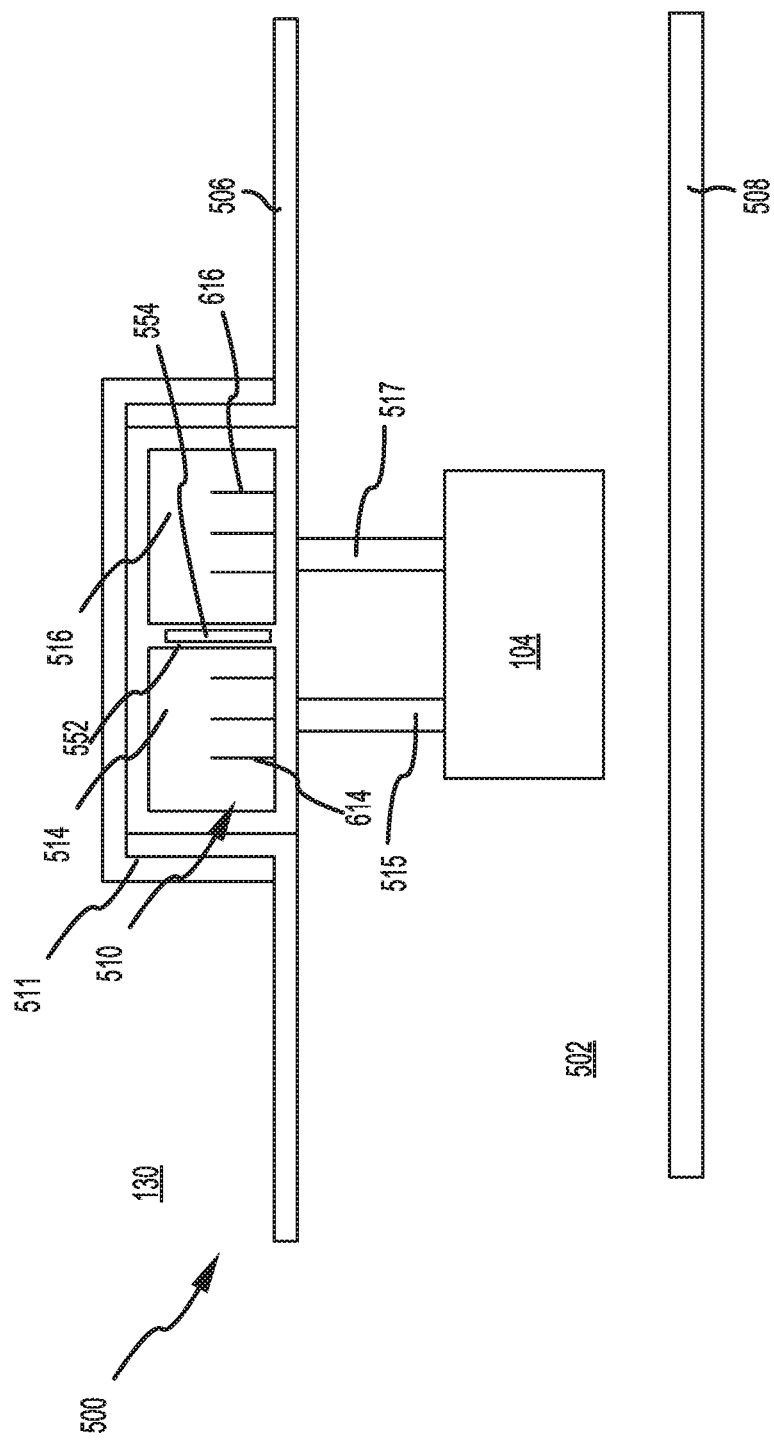
FIG. 5 illustrates a cross-section view of a cooling system having a plenum, in accordance with various embodiments.

Referring to FIG. 5, and with continued reference to FIG. 1, a cooling system 500 having a plenum 510 is illustrated, in accordance with various embodiments. Cooling system 500 includes one or more heat exchanger(s) 104. Heat exchanger(s) 104 may be located between an outer engine case structure 506 and an inner engine case structure 508. Outer engine case structure 506 is radially outward of inner engine case structure 508. Outer engine case structure 506 and inner engine case structure 508 may define a generally annular bypass duct 502 around the engine core. In various embodiments, inner engine case structure 508 may form a portion of engine static structure 36. In various embodiments, air discharged from, for example, fan section 22 may be communicated through the bypass duct 502. Plenum 510 may be disposed radially outward from the outer engine case structure 506. In various embodiments, plenum 510 is integral to outer engine case structure 506. In various embodiments, plenum 510 may be coupled to outer engine case structure 506 by any method known in the art, such as welding, brazing, or the like. In various embodiments, plenum 110 may comprise a supply conduit 514 and a return conduit 516. Plenum 510 may be annular in shape and/or form a full hoop around outer engine case structure 106. In various embodiments, plenum 510 may be enclosed by insulation 511 disposed radially outward of plenum 510. The insulation 511 may be configured to prevent heat from escaping plenum 510 during operation of gas turbine engine 20.

Return conduit 516 is fluidly coupled to an outlet 517 of heat exchanger 104. The cooled air in return conduit 516 may be directed downstream to cool components thermally challenged components. Return conduit 516 may be disposed axially adjacent to supply conduit 514. Return conduit 516 may extend circumferentially about outer engine case structure 506 and/or form an annular conduit. In various embodiments, the supply conduit 514 and/or the return conduit 116 may be integral to the outer engine case structure 506. In various embodiments, the supply conduit 514 and the return conduit 516 may be a monolithic component. By integrating the supply conduit 514 and/or the return conduit 516 into outer engine case structure 506, the cooling system 500 may experience reduced pressure loss in supply conduit 514 and/or the return conduit 516 relative to typical cooling systems in gas turbine engines. In various embodiments, the supply conduit 514 and/or the return conduit 516 may be coupled to the outer engine case structure 506 by any method known in the art, such as brazing, or the like.

In accordance with various embodiments, an inlet conduit may be fluidly coupled between an external source from an aircraft proximate engine bay 130 and supply conduit 514. The inlet conduit may be in accordance with inlet conduit 112. Engine bay 130 may be disposed radially outward from outer engine case structure 506. Supply conduit 514 may extend circumferentially about outer engine case structure 506 and/or form an annular conduit. The external source from the aircraft may be disposed radially outward of outer engine case structure 506. Supply conduit 514 is fluidly coupled to an inlet 515 of heat exchanger 104. Supply conduit 514 may be fluidly coupled to each heat exchanger 104 by a respective inlet 515 extending radially inward from supply conduit 514.

In various embodiments, plenum 510 further comprises an axial wall 552 disposed between the supply conduit 514 and the return conduit 516. The axial wall 552 may partially define supply conduit 514 and return conduit 516. In various embodiments, the axial wall comprises a cavity 554 disposed therein. The cavity 554 may extend circumferentially about plenum 510. The cavity 554 may be an annular cavity. In various embodiments, the cavity 554 may act as an air pocket and/or prevent heat transfer from the supply conduit 514 and the return conduit 516.

In various embodiments, supply conduit 514 and/or return conduit 516 may each comprise a substantially rectangular cross section. In various embodiments, the supply conduit 514 and/or return conduit 516 may each comprise a substantially square cross section. In various embodiments, supply conduit 514 may comprise a plurality of heat transfer fins 614 extending from a radially inner surface of supply conduit 514. Similarly, return conduit 516 may comprise a plurality of heat transfer fins 616 extending radially outward from a radially inner surface of return conduit 516.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cooling system for a gas turbine engine, comprising:
an outer engine case structure;
an inner engine case structure disposed radially inward of the outer engine case structure, the inner engine case structure and the outer engine case structure defining a bypass duct;
a heat exchanger disposed between the outer engine case structure and the inner engine case structure;
a supply conduit disposed radially outward of the outer engine case structure, the supply conduit extending circumferentially about the outer engine case structure, the supply conduit fluidly coupled to the heat exchanger;
a return conduit disposed radially outward of the outer engine case structure and axially adjacent to the supply conduit, the return conduit extending circumferentially about the outer engine case structure, the return conduit fluidly coupled to the heat exchanger;
an insultation configured to enclose the supply conduit and the return conduit, the insulation defining a plenum, the supply conduit and the return conduit disposed within the plenum;
a first plurality of heat fins coupled to the supply conduit and extending from a first radially inner surface of the supply conduit, each heat fin in the first plurality of heat fins extending away from the outer engine case structure; and
a second plurality of heat fins coupled to the return conduit and extending from a second radially inner surface of the return conduit, each heat fin in the second plurality of heat fins extending away from the outer engine case structure.

2. The cooling system of claim 1, wherein the supply conduit comprises a first annular tube, and wherein the return conduit comprises a second annular tube.

3. The cooling system of claim 1, wherein the supply conduit and the return conduit are integral to the outer engine case structure.

4. The cooling system of claim 1, wherein the outer engine case structure, the supply conduit, and the return conduit are a monolithic component.

5. The cooling system of claim 1, wherein the supply conduit and the return conduit are radially adjacent to the outer engine case structure.

6. A cooling system for use in a gas turbine engine, comprising:
an outer engine case structure;
an inner engine case structure disposed radially inward of the outer engine case structure, the inner engine case structure and the outer engine case structure defining a bypass duct;
a heat exchanger disposed between the outer engine case structure and the inner engine case structure;
a supply conduit extending circumferentially about the outer engine case structure, the supply conduit fluidly coupled to the heat exchanger;
a return conduit extending circumferentially about the outer engine case structure, the return conduit fluidly coupled to the heat exchanger;
an axial wall disposed between and partially defining the supply conduit and the return conduit, the axial wall at least partially defining a first flow path within the supply conduit and a second flow path within the return conduit;
a first plurality of heat fins coupled to the supply conduit and extending from a first inner surface of the supply conduit, each heat fin in the first plurality of heat fins extending away from the outer engine case structure; and
a second plurality of heat fins coupled to the return conduit and extending from a second inner surface of the return conduit, each heat fin in the second plurality of heat fins extending away from the outer engine case structure.

7. The cooling system of claim 6, wherein the axial wall comprises a cavity disposed between a first axial surface in the supply conduit and a second axial surface in the return conduit.

8. The cooling system of claim 6, wherein the supply conduit, the return conduit, and the axial wall are integral to the outer engine case structure.

9. The cooling system of claim 6, wherein the supply conduit and the return conduit each have a substantially rectangular cross-sectional shape.

10. The cooling system of claim 6, further comprising insulation configured to enclose the supply conduit, the return conduit, and the axial wall.

11. The cooling system of claim 6, wherein the supply conduit and the return conduit are annular in shape.

12. A gas turbine engine, comprising:
an outer engine case structure;
an inner engine case structure disposed radially inward of the outer engine case structure, the inner engine case structure and the outer engine case structure defining a bypass duct;
a heat exchanger disposed between the outer engine case structure and the inner engine case structure;
a supply conduit extending circumferentially about the outer engine case structure, the supply conduit fluidly coupled to the heat exchanger;
a return conduit disposed axially adjacent to the supply conduit, the return conduit extending circumferentially about the outer engine case structure, the return conduit fluidly coupled to the heat exchanger;
an insultation configured to enclose the supply conduit and the return conduit, the insulation defining a plenum, the supply conduit and the return conduit disposed within the plenum;
a first plurality of heat fins coupled to the supply conduit and extending from a first inner surface of the supply conduit, each heat fin in the first plurality of heat fins extending away from the outer engine case structure; and
a second plurality of heat fins coupled to the return conduit and extending from a second inner surface of the return conduit, each heat fin in the second plurality of heat fins extending away from the outer engine case structure.

13. The gas turbine engine of claim 12, further comprising an axial wall disposed between the supply conduit and the return conduit.

14. The gas turbine engine of claim 13, wherein the axial wall comprises a cavity disposed between a first axial surface in the supply conduit and a second axial surface in the return conduit.

15. The gas turbine engine of claim 12, wherein the supply conduit, the return conduit, and the outer engine case structure are a monolithic component.

* * * * *